Patented Apr. 22, 1952

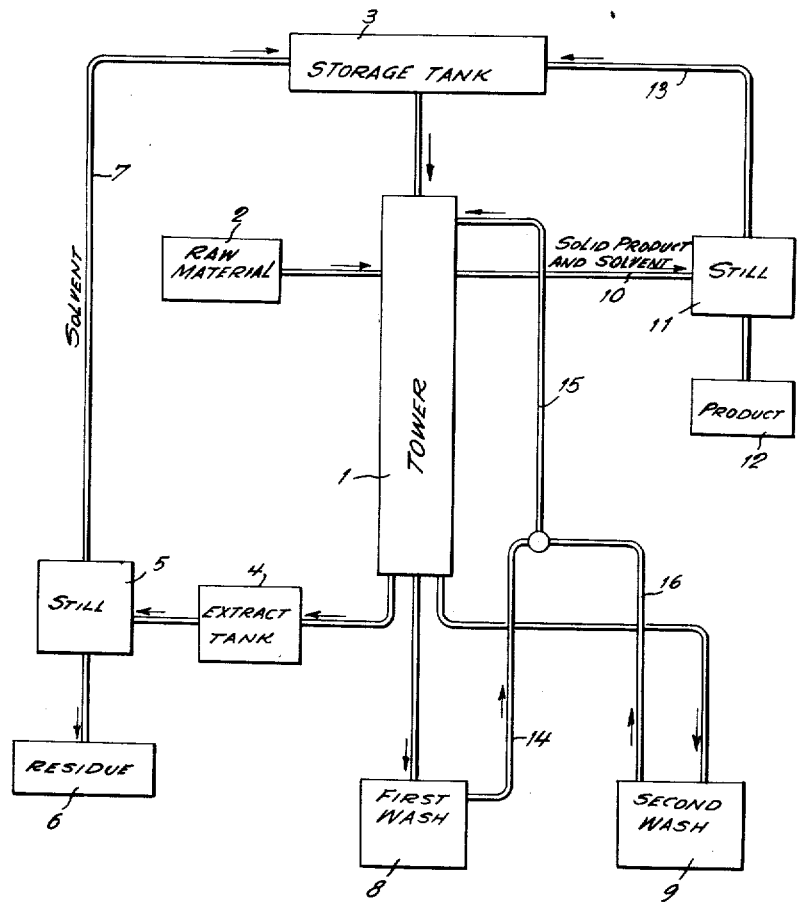

2,593,458

UNITED STATES PATENT OFFICE 2,593,458

METHOD OF PURIFYING SOLID SATURATED FATTY ACIDS CONTAINING UNSATURATED FREE FATTY ACIDS AND OTHER SOLUBLE IMPURITIES

Leslie G. Jenness, Memphis, Tenn., assignor to The Trendex Co., Memphis, Tenn., a corporation of Tennessee Application July 7, 1948, Serial No. 37,463

22 Claims. (Cl. 260—419)

The present invention is directed to the treatment of fatty materials, more particularly to a method of separating saturated fatty acids, usually the higher fatty acids from other constituents of mixtures containing the same and to the recovery of said other constituents in addition to said fatty acids.

Several methods have heretofore been used for the separation of said saturated fatty acids from mixtures with unsaturated fatty acids, principally by the use of distillation methods whereby fractions are obtained and thus the constituents separated. Often in conjunction with distillation there was used a solvent crystallization method of further separating the individual constituents of the mixture being treated. Such methods are unsatisfactory in a number of respects. Usually it was almost impossible to obtain a clear separation between the several constituents and therefore the final products did not have the desired characteristics. The equipment necessary for the operation of such processes was quite complicated and expensive and in particular because in fractional distillation a relatively high vacuum was usually maintained. The cost of the operations was relatively high and skilled workers were necessary in order to maintain satisfactory operation.

The present invention is intended and adapted to overcome the difficulties and disadvantages inherent in prior methods for the preparation of fatty acids, it being among the objects of the present invention to provide a method which is adapted for the treatment of mixtures of saturated fatty acids containing one or more other constituents such as glycerides, unsaponifiable matter, coloring matter, unsaturated fatty acids, gums and the like to give relatively pure individual constituents.

It is also among the objects of the present invention to provide a method which will eliminate the necessity for fractional distillation of mixtures, avoid the use of vacuum and operate without the necessity of crystallizing the desired constituents.

It is further among the objects of the present invention to provide a method of separation of saturated from unsaturated fatty acids from relatively pure or impure mixtures containing the same.

It is still further among the objects of the present invention to provide a method of separation of resin acids from admixtures thereof with fatty acids, either saturated or unsaturated, or both.

It is still further an object of the present invention to provide a method of not only recovering the saturated fatty acids from said mixtures but also of recovering the minor but valuable constituents associated therewith, such recovery being either as the principal purpose of the operation or as a by-product from the recovery of the saturated fatty acids.

In practicing the present invention there is provided a process in which the raw material is in solid form and is sufficiently coherent to allow the same to be made into the form of flakes, granules or other discrete particles. Such a starting material is placed in a suitable vessel such as an extraction tower and treated with a volatile organic liquid which is a solvent for the constituents other than the saturated fatty acid. Sufficient contact between the liquid and solid is provided so that the solvent may penetrate into the central portions of the particles and dissolve therefrom the soluble constituents without materially dissolving the non-extractible substances, namely the saturated fatty acids. The operation results in the discrete particles remaining as such without any substantial amount of disintegration, thereby allowing an effective and rapid removal of the soluble substances therefrom. The resulting solution is removed and the substances contained therein recovered in any desired manner. The remaining discrete particles containing some solvent which is held mechanically, may then be treated for the removal of the solvent and the recovery of a highly purified saturated fatty acid or mixtures of such acids.

The starting material, which is a fatty acid product, may be transformed into discrete particles in a number of ways. The material may be first melted and then subjected to a flaking operation or it may be sprayed to gives granules. Also, the molten material may first be flaked and then ground to give particles of the desired size. The particles may be obtained by graining or other type of crystallization operation. The particles may be produced by mechanically breaking up a relatively large mass of the starting material.

The purpose of the sub-division of the starting material is intended to obtain a composition to be treated wherein there is a fairly uniform distribution of soluble and insoluble constituents in the mass. In other words, the extractibles and non-extractibles should be distributed relatively homogeneously so that when extracted the particles are not materially disintegrated. Because of such physical state, there is obtained a free flow of solvent through the mass of particles, a uniform and thorough extraction of the solubles by the solvent, and a minimum coalescing of the particles during the operation. This allows the product to be handled easily and avoids a semi-colloidal state which would introduce difficulties in the separation of solids from the solvent.

The extractible constituents are those which are practically completely soluble in the particular solvents used under the conditions of the operation. They are the substances which are desired to be removed from the saturated fatty acids. While it is intended that none of the saturated fatty acids be dissolved or extracted, it is impossible under the conditions of the operation to prevent a small proportion of such substances from dissolving because there is some slight solubility thereof in most of the solvents suitable for the operation. It is intended to avoid or minimize such solubility by the selection of favorable solvents, temperatures and other conditions but some times a small proportion of such non-extractibles is included in the extracted solution.

The relative proportions of the extractible to non-extractible material in the particles is important. The amount of extractible material should be below the point where the remainder of the particles is so fragile as to be substantially broken down during the operation to a point where the break-down would interfere with the free-flow of solvent through the mass and the uniform and effective penetration thereof into the solid particles. If the proportion of extractibles is too high to prevent such break-down, then there is added to the starting material a suitable amount or proportion of non-extractible substances. The addition may be either of the final product of the operation or of a different raw material, the blending of which will give the desired consistency of the starting material by reinforcing the same. If the amount of extractibles in the particles is too low, a difficulty arises that there may be insufficient penetration of the solvent into the particles and thus effective extraction would not be attained. In such case, there is added to the starting material a sufficient amount of a composition high in extractibles to bring the amount thereof up to the proper point. In the alternative, one may recycle into the starting material part of the residue obtained by a previous extraction cycle to accomplish the same purpose.

Various types of solvents may be used, and although at the present, it is considered that volatile hydrocarbons are eminently suitable for conducting the process, various other types of solvents may be used. The character thereof depends upon the character of the raw material, the solubilities of the constituents to be extracted and the character of the constituents which are intended to remain behind as solids. The hydrocarbon solvents, particularly of the aliphatic series, have proven quite satisfactory for dissolving such compounds as unsaturated fatty acids, glycerides, coloring matter, etc. Other types of solvents such as acetone may be used similarly but in general, they may be less effective and are more expensive than the hydrocarbon solvents.

Where a raw material such as hydrogenated tall oil is to be treated, aromatic or cyclic hydrocarbons or mixtures thereof with aliphatic hydrocarbons are preferable for extracting the resin acids contained therein. Among the various types of volatile solvents having the necessary selective solubility for the extractibles are chlorinated hydrocarbons, furane compounds, such as furfural, hydrocyclic compounds such as thiophene, monohydric alcohols, ethers and mixtures of such solvents.

After the extraction has been completed, the discrete particles of relatively pure saturated fatty acids may be recovered from the residual solvent which is always entrained therein, by various methods. For instance, the wet flakes may be dissolved in a hot solvent and the solution thereof distilled to remove such solvent.

In a continuous or semi-continuous system of operation, the wet particles may be melted, run into a still and subjected to distillation at ordinary or reduced pressures to remove the solvent. At the end of the distillation, steam may be blown into the still at a temperature over 100° C. to remove the last traces of solvent. In a batch process, the extracted wet particles may be treated under reduced pressure with or without a current of inert gas to remove the entrained solvent.

The present process may be applied to a considerable variety of raw material which may be advantageously treated thereby. For instance, tall oil which is partially or fully hydrogenated may be treated with a suitable solvent such as benzene or mixtures thereof with heptane, whereby the resin acids are extracted in solution together with unsaturated fatty acids and unsaponifiables whereby a highly pure saturated fatty acid mixture obtained by split oils whether tially or completely hydrogenated tallow or fish oil or mixtures thereof may be separated in accordance with the present invention to recover a solid saturated fatty acid material and separately the other constituents of the starting material.

The invention may also be applied to the fractionally distilled fatty acids obtained by the splitting of oils such as tallow, cottonseed and others and containing some unsaturated constituents among the saturated fatty acid. It may also be used in the treatment of commercial stearic acid to improve the grade thereof. Also, the crude fatty acid mixture obtained by split oils whether hydrogenated or unhydrogenated, may be treated by the present process. Another use of the process is in the treatment, for example, of cottonseed stearine obtained during the winterizing of glyceride oils which is split and the fatty acids treated to give a product rich in palmitic acid. In the case of cottonseed stearine, the ratio of palmitic to stearic acids is about 10 to 1.

The process may also be used as an adjunct to other operations involving saturated and unsaturated fatty acids. For instance, it has been proposed to recover a high concentrated oleic acid from animal or other fats by first selectively hydrogenating the fat until it is low in poly-unsaturated acids. It was then customary to subject the product to a series of distillations and crystallizations from suitable solvents to concentrate the oleic acid. The present process may be applied to the hydrogenated fat and there be obtained directly an oleic acid residue which is highly concentrated. In order to further purify the product, it may then be subjected to a low temperature crystallization from acetone in accordance with prior practice.

The nature of the invention is indicated by the diagrammatic showing in the accompanying drawing, which constitutes a part hereof and in which like reference characters indicate like parts.

The single figure is a diagrammatic view of a system adapted for batch operation of the present invention.

There is provided an extraction tower 1 generally of cylindrical form and having a height equal to about three times the diameter thereof. The raw material 2 to be treated is introduced into the tower until it is nearly filled. Solvent 3 is introduced into the tower to a point where it covers the material. It is allowed to stand until the extraction is substantially complete. The solution is then drained into tank 4 and may be sent to still 5 where the solvent is evaporated, giving a residue 6. The solvent 7 is returned to storage tank 3 for re-use.

Another quantity of solvent constituting the first wash is then introduced from tank 3 into tower 1 and allowed to flow into the first wash tank 8. Then a second wash is similarly introduced into the tower and the solution so obtained is allowed to flow into second wash tank 9. The solid product 10 remaining in the tower is removed, placed into still 11 where the solvent is evaporated and a solid product 12 of pure nature obtained. The solvent 13 is returned to tank 3.

In subsequent operations, the extraction is conducted with solvent from first wash tank 8 passing through valved pipes 14 and 15. The first wash is conducted with solvent from second wash tank 9 flowing through pipes 16 and 15. The second wash is accomplished with fresh clean solvent from tank 3. The cycle may then be repeated.

The following are specific examples of the operation of the present invention:

Example 1

30 lbs. of hydrogenated, split and flaked soya bean oil black grease, having an F. F. A. of 87.0, an iodine number of 4.1 and an F. A. C. color of 33, is placed in the vertical tower, which contains a perforated false bottom, upon which is supported a No. 4 filter cloth. 4.75 gal. of heptane is introduced into the tower to just cover the flakes. The heptane has a boiling point of about 98° C. The temperature of the flakes is about 66° F., while the temperature of the heptane introduced into the tower has a temperature of about 75° F.

After about one hour, the extract is withdrawn from the bottom of the tower, fresh solvent is added to the top of the tower at the same rate as the extract is withdrawn until 4.75 gal. of extract is withdrawn. The withdrawal is continued with the addition of 4.75 gal. of fresh solvent and the withdrawals separately collected, giving a first and second wash fraction. The second wash fraction is only a part of the third solvent fraction because part of the solvent is entrained in the wet flakes. The product is removed from the tower and air-dried to expel entrained solvent. It has an F. F. A. of about 99.1%, an iodine number of 0.6 and a color of 5.0 red on the Lovibond scale. The residue after the evaporation of solvent from the extract contains about 61% of free fatty acids and 9% of unsaponifiables, the mixture having an iodine number of 14.4.

Example 2

The materials and the operation are similar to those of Example 1. In order to make the cycle more continuous, the solvent is introduced into the tower in serial order, the first wash being used as the initial solvent for extraction; the second wash constitutes the first wash and the fresh solvent constitutes the second wash.

The wet particles resulting from the operation are dissolved in a relatively large quantity of solvent and bleached by the addition of 2% of carbon black, after which the solvent is evaporated under reduced pressure in a still. The product has a color of 0.7 red, an F. F. A. of 99.0% and an iodine number of 0.55. The residue from the extract has the same composition as in Example 1.

The residues recovered from the treatment of the soya bean grease are capable of furnishing highly valuable products. By the present process the amount of unsaponifiables, which is about 3% in the grease, is increased to about 9% in the residue. This may then be fractionally distilled to remove the unsaturated fatty acids, whereby the unsaponifiables are concentrated to about 40% and the residue from such distillation contains most of the coloring matter, thus improving the quality as well as the concentration of the unsaponifiables. The residue may be hydrogenated, split and re-treated by the present method whereby the unsaponifiable content is increased to 25–30% and a distillation operation thereon will up-grade the unsaponifiables to about 60%. If desired, the residue may in the alternative be re-cycled to the hydrogenation step in conjunction with black grease and thus a higher concentration of unsaponifiables may be built up. Also, the residue as obtained from the extraction process may be split directly and then distilled whereby the unsaponifiables are concentrated to 50–60%.

Such unsaponifiables contain substantial amounts of tocopherol, which is vitamin E. It also contains stigmasterol, which is usable in making sex hormones. Where such oils as tallow and fish oils are treated, important amounts of cholesterol are obtained. The residues may have still other valuable constituents and the residues obtained from other starting materials are capable of producing still other commercially valuable compounds. The residues and the above described fractions obtained therefrom may be treated by selective solvents or distillation or both to still further concentrate valuable constituents.

In the case of the residues obtained by the treatment of hydrogenated tall oil, the high concentration of rosin acids as well as fatty acids renders the same valuable for direct use in making soaps. On the other hand, if desired, these residues may be separated into relatively pure fractions for industrial operations and the production of conversion products thereof such as alkyd resins, esters with mono and polyhydric alcohols and the like.

There are numerous advantages resulting from the operation of the present invention. For instance, the equipment used is of simple character, being relatively small for the capacity thereof and being inexpensive. In many instances, ordinary commercial extraction equipment such as is used in various industries is applicable without redesigning or alteration.

The amount of solvent used is only a small part of that necessary in crystallization operations, the amount being about 1 to 1 by volume compared to the necessary use in most cases at least in crystallization operations, of 4 parts of solvent to 1 of the starting material. Because of this, there is less solvent to evaporate, rendering the process more effective and there is naturally less loss of solvent. The present process is readily adaptable for continuous operation while maintaining the simplicity of the equipment, whereas in crystallization systems, both the equipment and the operation are more complicated and more expensive. In crystallization, the types of solvents are limited to those giving filterable crystals and such solvents have generally proven to be less effective in the present extraction process, although in the present process it is not necessary to limit the solvents to such types.

The cycle in accordance with the present invention is much shorter than in crystallization since the latter requires heating, cooling and crystallization cycles and a solid separation cycle. As a result, in the present process the production per unit is relatively much larger than in crystallization. The present process may often be used to replace such processes as had previously required both distillation and crystallization cycles and thus there is a great saving in the investment necessary for operation. In fact, the equipment is much less expensive than the equipment for either the distillation or crystallization operation.

Because of the relatively small amount of solvent used in the present process, the loss of saturated fatty acids such as stearic by solution, is very much less as the acid has a constant and low solubility and therefore the more concentrated solutions reduce such loss. By re-cycling part of the residue its loss may be further reduced.

Although the invention has been described setting forth several specific embodiments thereof and stating a number of uses and advantages resulting therefrom, such statements have been made to illustrate the character of the invention without limiting the same. Many variations in the details of procedure may be made, as for example the operation may be made semi-continuous instead of a batch process and the solvent need not be allowed to stand in the tower but may flow continuously therethrough and the latter flow may be separated into various wash fractions for re-use in the cycle. The temperature may vary considerably but it is not feasible to state the upper limit in terms of degrees. The upper limit is the point where the known extractible portion becomes sufficiently soluble so that effective and economical separation thereof cannot be obtained. For instance, in Example 1 a temperature below 80° F. will dissolve not over about 7% of the non-extractible fatty acids. However, if the temperature were raised to 86° F., the loss by solution would be about double.

The lower limit of temperature is not at all critical as the degrees of solubility of the non-extractibles with lower temperatures is relatively small for comparable temperature changes. However, for practical operation, one should not use too low temperatures or refrigeration as the solubility of the extractibles also decreases with decreasing temperatures. With other substances than those of Example 1, the principles are the same but the critical temperatures and solubilities may differ. The process is operable where a solid material, organic or inorganic, is capable of being purified or recovered by crystallization from solutions thereof whereby the important result is accomplished of dissolving away accompanying substances from the solid materials.

Other changes in the details may include the substitution of other bleaching agents than the carbon black set forth in Example 2. Various other starting materials containing saturated fatty acids having from 6 to 22 carbon atoms or higher, such as fish oils, may be treated although the process has been particularly adapted for the separation of those saturated fatty acids having from 12 to 18 carbon atoms. The process may be made semi-continuous or even entirely continuous. Other starting materials may be used, such as black grease or equivalent materials from other sources than soya bean oil.

I claim:

1. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, contacting said material with an organic volatile solvent for said unsaturated fatty acids and said impurities, said saturated fatty acids being substantially non-extractible by said solvent, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution.

2. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, contacting said material with an organic volatile solvent for said unsaturated fatty acids and said impurities, said saturated fatty acids being substantially non-extractible by said solvent, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution, and separating the solid saturated fatty acids from residual solvent contained therein.

3. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, contacting said material with an organic volatile solvent for said unsaturated fatty acids and said impurities, said saturated fatty acids being substantially non-extractible by said solvent, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution, the relative amounts of extractible and non-extractible constituents being such that after the extraction said particles are not materially disrupted.

4. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material wherein said fatty acids and other substances are fairly uniformly distributed, contacting said material with an organic volatile solvent for said unsaturated fatty acids and said impurities, said saturated fatty acids being substantially non-extractible by said solvent, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution.

5. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, having incorporated therein sufficient of said fatty acids to provide substantially undisrupted particles after extraction thereof, contacting said material with an organic volatile solvent for said unsaturated fatty acids and said impurities, said saturated fatty acids being substantially non-extractible by said solvent, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution.

6. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, having incorporated therein sufficient of said impurities to provide substantially undisrupted particles after extraction thereof, contacting said material with an organic volatile solvent for said unsaturated fatty acids and said impurities, said saturated fatty acids being substantially non-extractible by said solvent, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution.

7. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, contacting said material with an organic volatile solvent for said unsaturated fatty acids and said impurities, said saturated fatty acids being substantially non-extractible by said solvent, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing one resulting solution, evaporating said solvent from said solution and recovering the residue therefrom.

8. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, contacting said material with an organic volatile solvent for said unsaturated fatty acids and said impurities, said saturated fatty acids being substantially non-extractible by said solvent, maintaining a temperature below the point where there is substantial solubility of said fatty acids, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution.

9. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, contacting said material with an organic volatile solvent for said unsaturated fatty acids and said impurities, said saturated fatty acids being substantially non-extractible by said solvent, maintaining a temperature below about 80° F., the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution.

10. A method of treating a composition consisting essentially of fatty materials containing sufficient solid saturated free fatty acid so that it may be flaked and containing at least one of unsaturated free fatty acid and soluble impurities, said saturated acid and said impurities being in homogeneous mutual solution, which comprises forming discrete particles of said material, contacting said material with an organic volatile solvent for said unsaturated fatty acids and said impurities, said saturated fatty acids being substantially nonextractible by said solvent, the ratio of solvent to material being of the order of equal parts by volume, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution.

11. A method of treating solid fatty materials consisting essentially of saturated higher fatty acids together with at least one impurity taken from the group consisting of unsaturated fatty acids, glycerides of fatty acids, unsaponifiables contained in fatty oils, coloring matter and gums, which comprises forming discrete particles of said material, thereafter contacting the same with heptane, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said heptane to penetrate into said particles without substantially disrupting the same, and removing the resulting solution.

12. A method of treating solid fatty materials consisting essentially of saturated higher fatty acids together with at least one impurity taken from the group consisting of unsaturated fatty acids, glycerides of fatty acids, unsaponifiables contained in fatty oils, coloring matter and gums, which comprises forming discrete particles of said material, thereafter contacting the same with heptane, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said heptane to penetrate into said particles without substantially disrupting the same, maintaining a temperature below about 80° F., and removing the resulting solution.

13. A method of treating solid fatty materials consisting essentially of saturated higher fatty acids together with at least one impurity taken from the group consisting of unsaturated fatty acids, glycerides of fatty acids, unsaponifiables contained in fatty oils, coloring matter and gums, which comprises forming discrete particles of said material, thereafter contacting the same with heptane, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said heptane to penetrate into said particles without substantially disrupting the same, and removing the resulting solution, and separating the nonextractible constituent from residual heptane.

14. A method of treating solid fatty materials consisting essentially of saturated higher fatty acids together with at least one impurity taken from the group consisting of unsaturated fatty acids, glycerides of fatty acids, unsaponifiables contained in fatty oils, coloring matter and gums, which comprises forming discrete particles of said material, thereafter contacting the same with heptane, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said heptane to penetrate into said particles without substantially disrupting the same, the amounts of heptane and said material being approximately equal by volume, and removing the resulting solution.

15. A method of treating tall oil containing saturated fatty acids and impurities which comprises hydrogenating the same, forming discrete particles thereof, contacting said material with a volatile cyclic organic solvent for the resin acid constituent thereof, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles without substantially disrupting the same and removing the resulting solution.

16. A method of treating tall oil containing saturated fatty acids and impurities which comprises hydrogenating the same, forming discrete particles thereof, contacting said material with an aromatic hydrocarbon solvent for the resin acid constituent thereof, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles without substantially disrupting the same and removing the resulting solution.

17. A method of treating tall oil containing saturated fatty acids and impurities which comprises hydrogenating the same, forming discrete particles thereof, contacting said material with a benzene containing solvent for the resin acid constituent thereof, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles without substantially disrupting the same and removing the resulting solution.

18. A method of treating tall oil containing saturated fatty acids and impurities which comprises hydrogenating the same, forming discrete particles thereof, contacting said material with a mixture containing benzene and heptane as a solvent for the resin acid constituent thereof, the amount of said impurities relative to said saturated fatty acids being sufficient to allow penetration of said solvent into said particles to provide effective extraction and the amount of said impurities being insufficient to permt the remainder of said particles to be substantially broken down during said extraction, causing said solvent to penetrate into said particles without substantially disrupting the same and removing the resulting solution.

19. A method of treating solid fatty materials, saturated fatty acids and other substances which comprises providing hydrogenated black grease containing saturated fatty acids and impurities, forming discrete particles thereof contacting said material with a volatile hydrocarbon solvent for said substances, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles without substantially disrupting the same and removing the resulting solution.

20. A method of treating solid fatty materials, saturated fatty acids and other substances which comprises providing hydrogenated and split black grease containing saturated fatty acids and impurities, forming discrete particles thereof contacting said material with a volatile hydrocarbon solvent for said substances, said solvent containing heptane, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles without substantially disrupting the same and removing the resulting solution.

21. A method of preparing saturated fatty acids which comprises forming discrete, solid particles of a fatty material containing solid saturated fatty acids and fatty impurities in homogeneous mutual solution, contacting said particles with an organic solvent for said fatty substances present other than said saturated fatty acids, the amount of said solvent being sufficient to extract substantially all of said impurities, said solid fatty acids being substantially non-extractable by said solvent, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles and removing the resulting solution.

22. A method of treating solid fatty materials consisting essentially of saturated higher fatty acids together with at least one impurity taken from the group consisting of unsaturated fatty acids, glycerides of fatty acids, unsaponifiables contained in fatty oils, coloring matter and gums, which comprises forming discrete particles of said material, thereafter contacting the same with an organic solvent for said impurity, the amount of said impurities relative to said saturated fatty acids being sufficient to allow penetration of said solvent into said particles to provide effective extraction and the amount of said impurities being insufficient to permit the remainder of said particles to be substantially broken down during said extraction, causing said solvent to penetrate into said particles without substantially disrupting the same, and removing the resulting solution.

LESLIE G. JENNESS.

REFERENCES CITED

The following references are of record in the file of this patent:

UNITED STATES PATENTS

| Number | Name | Date |
|---|---|---|
| 2,012,106 | Mauersberger | Aug. 20, 1935 |

OTHER REFERENCES

Foreman et al., Oil and Soap, July 1944, pages 183–187.